Patented Dec. 5, 1922.

1,437,821

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PROCESS OF MAKING CELLULOSE ETHERS.

No Drawing.   Application filed April 5, 1921.   Serial No. 458,747.

*To all whom it may concern:*

Be it known that I, PAUL C. SEEL, a citizen of the United States of America, residing at Rochester, in the county of Monroe and State of New York, have invented certain new and useful Improvements in Processes of Making Cellulose Ethers, of which the following is a full, clear, and exact specification.

This invention relates to processes of making cellulose ethers. One object of my invention is to provide a process which produces cellulose ethers capable of yielding strong, transparent, flexible sheets or films. Other objects will hereinafter appear.

It has been proposed to make cellulose ethers by reacting on a very intimate mixture of cellulose and alkali with an etherifying agent, water being present in small amounts in certain cases. The reaction may be carried on in an autoclave until the desired degree of etherification has taken place. It has heretofore been the practice to heat the reaction mass in the autoclave to reaction temperature as rapidly as possible and then maintain that temperature throughout the reaction. With this end in view, the walls of the autoclave have been heated at the start, as by an oil bath, to a temperature equal to or greater than the reaction temperature. The reaction mass then becomes rapidly heated to the reaction temperature by contact with these relatively highly heated walls, such mass being agitated in the normal operation of the autoclave. In this way the rise in temperature of the mass takes place during a very small fraction of the reaction period, and during such heating the difference in temperature between the heat entering the mass and the temperature of the heat already in the mass is at a maximum.

I have found that ethers which yield better and stronger sheets or films can be made by using a relatively longer time for heating up the material. During this induction period, the walls of the reaction vessel are gradually heated up, so that during practically the entire period the walls are at a temperature below the reaction temperature. As a result, during this induction period the difference in temperature between the heat entering the reaction mass and the heat already in the mass is only a small part of the total rise in temperature which occurs during the whole induction period. In this way, no part of the mixture is subjected to relatively sudden and violent increases in temperature.

For example, I may place in an oil-heated autoclave a very thorough and intimate mixture of cellulose 100 parts, water 250 parts and caustic soda 200 parts. To this intimate mixture, or so-called soda-cellulose, I add 400 parts of the etherifying agent, such as ethyl chloride. The temperature is then gradually raised through heating the oil bath until the desired reaction temperature is reached. After the slow warming up or induction period is over, the reaction temperature is maintained during the residual period. By this I mean that the temperature during the residual period is kept within the range in which the etherification proceeds at a useful rate, and the temperature during such period may vary so long as it keeps within this range. Thus I may gradually heat up the mass from room temperature to between 90 and 170° C., over an induction period which is, at least, one-fourth of the residual period. By way of example, this induction period may occupy twelve hours and the residual period twelve hours; or the induction period may be five hours and the residual period eight hours; or the induction period may be three hours and the residual period five hours. But, of course, I am not limited to these proportions between the periods, because they may be greatly varied, so long as they utilize the principle of slowly raising the temperature of the mass without subjecting it to too rapid and violent heating. The increase in temperature during the induction period may proceed smoothly, the rate of increase being substantially constant at all times, or it may be performed by raising the temperature of the oil bath through steps of a small number of degrees at considerable intervals.

Having thus described my invention, what I claim as new and desire to secure by Letters Patent is:

1. The process of making cellulose ethers, which comprises the steps of gradually heating a reaction mass containing the cellulosic material, alkali, and etherifying agent to reaction temperature, and then maintaining said mass at reaction temperature during the further etherification.

2. The process of making alkyl ethers of cellulose, which comprises the steps of gradually raising the temperature of a reaction mixture containing alkali, cellulose and an alkylating agent to reaction temperature and then maintaining said mass at reaction temperature during the remainder of the alkylation.

3. The process of making alkyl ethers of cellulose, which comprises the step of gradually heating a reaction mixture containing alkali, cellulose and an alkylating agent during an induction period to reaction temperature, and then maintaining said mixture at reaction temperature during the residual period, said induction period being greater than one-fourth of said residual period.

4. The process of making ethyl ethers of cellulose, which comprises the steps of gradually heating a reaction mixture containing cellulose, caustic soda and ethyl chloride during an induction period to reaction temperature, and then maintaining said mixture at reaction temperature during the residual period, said induction period being greater than one-fourth said residual period.

5. The process of making alkyl ethers of cellulose, which comprises the steps of gradually raising the temperature of a reaction mixture containing alkali, cellulose and an alkylating agent during an induction period to reaction temperature, and then maintaining said mixture at reaction temperature during the residual period, the heat imparted to said mixture during said induction period being at a temperature below reaction temperature.

6. The process of making ethyl ethers of cellulose, which comprises steps of gradually heating a reaction mixture containing cellulose, caustic soda, and ethyl chloride during an induction period to reaction temperature, and then maintaining said mixture at reaction temperature during the residual period, the heat imparted to said mixture during said induction period being at a temperature below reaction temperature.

7. The process of making alkyl ethers of cellulose, which comprises the steps of gradually raising the temperature of a reaction mixture containing alkali, cellulose and an alkylating agent during an induction period to reaction temperature, and then maintaining said mixture at reaction temperature during the residual period, the difference in temperature between the heat entering the mixture and the heat already in the mixture at any time during said induction period being a fraction of the total rise in temperature during the whole induction period.

8. The process of making ethyl ethers of cellulose, which comprises the steps of gradually heating a reaction mixture containing cellulose, caustic soda and ethyl chloride during an induction period to reaction temperature, and then maintaining said mixture at reaction temperature during the residual period, the difference in temperature between the heat entering the mixture and heat already in the mixture at any time during said induction period being a fraction of the total rise in temperature during the whole induction period.

Signed at Rochester, New York, this 31st day of March, 1921.

PAUL C. SEEL.